US009965279B2

(12) United States Patent
Padmanabha et al.

(10) Patent No.: US 9,965,279 B2
(45) Date of Patent: May 8, 2018

(54) RECORDING PERFORMANCE METRICS TO PREDICT FUTURE EXECUTION OF LARGE INSTRUCTION SEQUENCES ON EITHER HIGH OR LOW PERFORMANCE EXECUTION CIRCUITRY (71) Applicants: Shruti Padmanabha, Ann Arbor, MI (US); Andrew Lukefahr, Ann Arbor, MI (US); Reetuparna Das, Ann Arbor, MI (US); Scott Mahlke, Ann Arbor, MI (US)

(72) Inventors: Shruti Padmanabha, Ann Arbor, MI (US); Andrew Lukefahr, Ann Arbor, MI (US); Reetuparna Das, Ann Arbor, MI (US); Scott Mahlke, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 824 days.

(21) Appl. No.: 14/093,042

(22) Filed: Nov. 29, 2013

(65) Prior Publication Data
US 2015/0154021 A1 Jun. 4, 2015

(51) Int. Cl.
G06F 9/38 (2006.01)
G06F 9/30 (2018.01)
G06F 1/32 (2006.01)

(52) U.S. Cl.
CPC .......... G06F 9/30058 (2013.01); G06F 1/329 (2013.01); G06F 1/3293 (2013.01);
(Continued)

(58) Field of Classification Search
None
See application file for complete search history.

(56) References Cited

U.S. PATENT DOCUMENTS 6,317,840 B1 11/2001 Dean et al.
9,569,279 B2* 2/2017 Hicok
(Continued)

FOREIGN PATENT DOCUMENTS

CN 1605063 A 4/2005
CN 101464721 A 6/2009
CN 101790709 7/2010

OTHER PUBLICATIONS

Augonnet, Cédric; Thibault, Samuel ; Namyst, Raymond. "Automatic Calibration of Performance Models on Heterogeneous Multicore Architectures" Euro-Par 2009 ParallelProcessing Workshops. HPPC, HeteroPar, Proper, Roia, Unicore, VHPC. Revised Selected Papers: 10 .;xix+468. Springer Verlag. (2009).*

(Continued)

Primary Examiner — Jacob A Petranek
(74) Attorney, Agent, or Firm — Nixon & Vanderhye P.C.

(57) ABSTRACT

An apparatus for processing data includes first execution circuitry, such as an out-of-order processor, and second execution circuitry, such as an in-order processor. The first execution circuitry is of higher performance but uses more energy than the second execution circuitry. Control circuitry switches between the first execution circuitry being active and the second execution circuitry being active. The control circuitry includes prediction circuitry which is configured to predict a predicted identity of a next sequence of program instructions to be executed in dependence upon a most recently executed sequence of program instructions and then in dependence upon this predicted identity to predict a predicted execution target corresponding to whether the next sequence of program instructions should be executed by the first execution circuitry or the second execution circuitry.

20 Claims, 4 Drawing Sheets (52) U.S. Cl.
CPC .......... *G06F 9/3836* (2013.01); *Y02B 60/121* (2013.01); *Y02B 60/144* (2013.01)

(56) References Cited

U.S. PATENT DOCUMENTS

| | | | | |
|---|---|---|---|---|
| 9,619,284 | B2* | 4/2017 | Sakarda | G06F 9/4893 |
| 2003/0115242 | A1 | 6/2003 | Hayduk | |
| 2004/0003215 | A1* | 1/2004 | Krimer | G06F 9/3869 712/235 |
| 2006/0095913 | A1* | 5/2006 | Bodas | G06F 9/5027 718/100 |
| 2008/0263324 | A1* | 10/2008 | Sutardja | G06F 1/3203 712/43 |
| 2009/0164812 | A1* | 6/2009 | Capps, Jr. | G06F 1/3203 713/320 |
| 2009/0293061 | A1* | 11/2009 | Schwinn | G06F 9/3851 718/103 |
| 2009/0327944 | A1* | 12/2009 | Sugure | G06F 17/5022 715/772 |
| 2011/0213993 | A1 | 9/2011 | Greenhalgh | |
| 2011/0271126 | A1 | 11/2011 | Hill | |
| 2012/0233477 | A1* | 9/2012 | Wu | G06F 1/3287 713/320 |
| 2013/0080805 | A1* | 3/2013 | Vick | G06F 8/4432 713/320 |
| 2014/0101411 | A1* | 4/2014 | Sakarda | G06F 15/7842 712/42 |
| 2014/0281402 | A1* | 9/2014 | Comparan | G06F 9/3855 712/214 |

OTHER PUBLICATIONS

Jason Cong, Bo Yuan. "Energy-efficient scheduling on heterogeneous multi-core architectures" "Energy-Efficient Scheduling on Heterogeneous Multi-Core Architecture" ISLPED 2012, Jul. 30-Aug. 1, 2012.*
U.S. Appl. No. 14/323,040, filed Jul. 3, 2014, Padmanabha et al.
International Search Report and the Written Opinion of the International Searching Authority dated Jan. 28, 2015 in PCT/US2014/060393, 8 pages.
UK Combined Search and Examination Report dated Oct. 8, 2015 in GB 1508774.5, 5 pages.
T. Sherwood et al, "Discovering and Exploiting Program Phases" IEEE Nov. 2003, pp. 84-93.
T. Sherwood et al, "Phase Tracking and Prediction" Proceedings of the 30th International Symposium on Computer Architecture (ISCA), Jun. 2003, pp. 1-12.
J.E. Smith et al, "Dynamic Microarchitecture Adaptation via Co-Designed Virtual Machines" 2002 IEEE International Solid-State Circuits Conference, 2002, 2 pages.
E. Rotenberg et al, "Trace Processors" Proceedings of Micro-30, Dec. 1997, 12 pages.
R. Kumar et al, "Core Architecture Optimization for heterogeneous Chip Multiprocessors" PACT'06, Sep. 2006, 10 pages.
K.K. Rangan et al, "Thread Motion: Fine-Grained Power Management for Multi-Core Systems" ISCA '09, Jun. 2009, 12 pages.
P. Greenhalgh, Big.LITTLE Processing with ARM Cortex™-A15 & Cortex-A7, Sep. 2011, 8 pages.
A. Lukefahr et al, "Composite Cores: Pushing Heterogeneity into a Core" Dec. 1, 2012, 12 pp.
Padmanabha, Shruti, et al "Trace based phase prediction for tightly-coupled heterogeneous cores." Proceedings of the 46th Annual IEEE/Acm International Symposium on Microarchitecture. Acm, Dec. 7, 2013, 12 pgs.
Rotenberg, Eric, et al. "Rationale for a 3D Heterogeneous Multi-core Processor." migration 100.1K, Oct. 6, 2013, 15 pgs.
International Preliminary Report on Patentability mailed Jun. 9, 2016 in PCT/US2014/060393, 6 pp.
Final Office Action dated May 4, 2017 in co-pending U.S. Appl. No. 14/323,040 15 pages.
Office Action dated Dec. 6, 2016 in co-pending U.S. Appl. No. 14/323,040 21 pages.
Chinese First Office Action dated Feb. 1, 2018 in CN 201480063809.7 and English translation, 15 pages.

* cited by examiner

RECORDING PERFORMANCE METRICS TO PREDICT FUTURE EXECUTION OF LARGE INSTRUCTION SEQUENCES ON EITHER HIGH OR LOW PERFORMANCE EXECUTION CIRCUITRY

BACKGROUND

This invention relates to the field of data processing systems. More particularly, this invention relates to the field of data processing systems having a plurality of execution mechanisms for executing program instructions and between which a selection may be made as to which execution mechanism is active to execute the stream of program instructions at a given time.

It is known to provide data processing systems, such as those employing the techniques of the big.LITTLE processors designed by ARM Limited of Cambridge, England, which incorporate multiple execution mechanisms among which an active execution mechanism is selected. These processors typically include a low performance and low power processor core together with a high performance and high power processor core. When the processing workload is such that high performance is not required, then the processing is switched so as to be performed by the more energy efficient low power processor core. Conversely, when the processing workload is such that high performance is necessary, then the work load is switched to the high performance processor core. The granularity with which the switching is performed in such systems is large as it can take many hundreds of thousands of processing cycles to move the processor state from the small low power processor core to the large high performance processor core.

While the above systems may be used with advantage, it has been noted that in many real life processing loads the change between a requirement for high performance vs low power occur at a finer level of granularity than may be dealt with in a system in which processing when one of the causes shut down, the entire processor state transferred to the other processor core and then that other processor core is started. This restricts the benefit which can be achieved.

SUMMARY

Viewed from one aspect the present invention provides an apparatus for processing data under control of program instructions, said apparatus comprising:

first execution circuitry configured to execute program instructions;

second execution circuitry configured to execute said program instructions, said second execution circuitry having a lower energy consumption when executing said program instruction than said first execution circuitry, and said second execution circuitry requiring a longer time to execute said program instructions than said first execution circuitry; and control circuitry configured to control whether said program instructions are executed by said first execution circuitry or said second execution circuitry, wherein said control circuitry comprises prediction circuitry configured:

(i) to predict a predicted identity of a next sequence of program instructions to be executed in dependence upon a most recently executed sequence of program instructions; and (ii) in dependence upon said predicted identity, to predict a predicted execution target corresponding to whether said next sequence of program instructions should be executed with said first execution circuitry or said second execution circuitry; and said control circuitry is configured to select either said first execution circuitry or said second execution circuitry to execute said next sequence of program instructions in dependence upon said predicted execution target.

The present techniques recognize that when performing switching between first execution circuitry and second execution circuitry to execute the program instructions it is desirable that the execution circuitry selected for use should be appropriate for the next sequence of program instructions to be executed. One way of controlling the switching between the execution circuitry in use is to examine the requirements of the sequence of program instructions that have most recently been executed and assume that the next sequence of program instructions to be executed will have the same requirements. While there is some correlation between the processing requirements of adjacent sequences of program instructions, in practice the prediction that the next sequence of program instructions will have similar requirements to the last sequence of program instructions is limited in accuracy. The present techniques improve upon such an approach by the provision of prediction circuitry which predicts the identity of a next sequence of program instructions to be executed in dependence upon a most recently executed sequence of instructions, and then uses the predicted identity of the next sequence of program instructions to predict a required execution target for that next sequence of program instructions. Thus, the prediction circuitry first predicts what will be the identity of the next sequence of program instructions to be executed and then uses that identity to predict which is the most appropriate execution target for that next sequence of program instructions. This technique is able to achieve a high degree of suitability for the predicted execution target.

It will be appreciated that the program instructions may be divided into sequences of program instructions upon which the predictions may be made in a variety of different manners. There is a balance between the complexity and state storage requirements for monitoring and identifying sequences of program instruction weighed against the accuracy/uniqueness with which those sequences may be identified. In some embodiments the program instructions have associated addresses and a default program flow executes instructions in an order corresponding to advancing sequentially through the addresses in a default direction (e.g. following an incrementing program counter value). Within such a context, the prediction circuitry may divide the program instructions into sequences including the next sequence of program instructions and the most recently executed sequence of program instructions. This division into sequences may be performed in accordance with the sequences containing more than a threshold number of program instructions and the sequences being bounded by non-sequential instructions at which program flow moves in a direction opposite to the default direction. The threshold number of program instructions ensures that the sequences have at least a minimum length, so as to guard against changing execution circuitry too frequently, while bounding the sequences with non-sequential instructions matches the way that the program flow naturally divides itself into sequences that share characteristics and repeat and accordingly may be subject to accurate and useful prediction.

The non-sequential instructions may comprise one or more of a branch instruction, a call instruction and a return instruction. In the case of the default direction being an incrementing address value, then these non-sequential instructions would be examples of branch instructions, call instructions and return instructions, which cause the address of the following instruction to be started at an address within the memory address space before the preceding instruction in the program flow execution order. Accordingly, such non-sequential instructions would be a backward branch instruction, a call instruction which caused a backward movement in address value or a return instruction which caused a backward movement in address value. It will be appreciated that if a call instruction causes a forward jump, then it will be inherent that the subsequent return instruction will cause a backward jump and accordingly provide a non-sequential instruction against which division of the program flow into sequences may be keyed.

The sequences of program instructions are free to contain one or more non-sequential instructions as such non-sequential instructions may occur within the sequence prior to the threshold number of program instruction for that sequence being reached.

The sequences of program instructions are bounded at their ends by non-sequential instructions. The non-sequential instruction may be included within the sequence it bounds or may in fact be included within the neighboring sequence. In some embodiments the sequences of program instructions are bounded at their execution start by a non-sequential instruction within an immediately preceding sequence of program instructions within the program flow.

An efficient way of generating useful identifier values for sequences of program instructions is to include within the prediction circuitry hash generating circuitry which generates a hash value forming at least part of the identifier value for a sequence of program instructions in dependence upon address values of at least some of the non-sequential instructions within that sequence of program instructions. The addresses of non-sequential instructions within a sequence of program instructions may be considered to provide a sort of "fingerprint" for that sequence which can be used to generate an identifier value which is sufficiently specific to that sequence to provide good differentiation from other sequences and yet is relatively efficient to generate and store.

In some embodiments the hash generating circuitry is configured to generate the hash value using a hashing function that gives greater weight to address values of non-sequential program instructions disposed later in program flow order within the sequence of program instructions. It has been found that the address values of such later occurring non-sequential program instructions provide better differentiation between other sequences when combined into the hash value by the hashing function and accordingly it is advantageous to give them greater weigh in the generation of the hash value.

The hash generating circuitry may be configured to generate the hash value using the hashing function that is dependent upon the latest N non-sequential program instructions and program flow order disposed within the sequence of program instructions. With such embodiments N is an integer value and may be, in some example embodiments, substantially equal to 15. This provides good specificity for the hash values whilst not unduly increasing the storage and calculation burden for hash values.

In some embodiments the prediction circuitry may also be configured to use at least part of a target address value of a program instruction executed following a non-sequential program instruction terminating a sequence of program instructions as at least part of the identifier value for that sequence of program instructions. The target address for the target instruction following a sequence has been found to provide a degree of discrimination between different sequences of program instructions for which it may be desired to associate different predictions for the next execution circuitry target.

In some embodiments the threshold number applied for dividing the program flow up in to sequences is between 100 and 10,000. In particular, in some example embodiments, the threshold number is substantially 300.

The way that the prediction circuitry uses the identifier value generated for the sequences can vary. In some embodiments the prediction circuitry is configured to generate an identifier value for the most recently executed sequence of instructions and comprises identifier prediction table circuitry that uses this identifier value as an index in order to predict an identifier value for a next sequence of program instructions to be executed.

With this type of embodiment, the prediction circuitry may also include target prediction table circuitry which uses the identifier for the next sequence of program instructions as an index into itself in order to predict the predicted execution target. Thus, the identifier prediction table circuitry is used to provide a mapping between the identifier of a sequence just executed and the identifier of a predicted next sequence, and then the identifier of this predicted next sequence is used to look up a prediction of which execution target should be used to execute that next sequence.

It will be appreciated that the first execution circuitry and the second execution circuitry can be formed in a variety of different ways, and may share different amounts of their circuitry/functionality. In some embodiments the first execution circuitry and the second execution circuitry share one or more of instruction fetch circuitry, instruction decoder circuitry, cache memory circuitry, branch prediction circuitry, memory management circuitry and translation of lookaside buffer circuitry.

The speed with which switches between the execution circuitry in use may be made can be increased in embodiments in which the first execution circuitry comprises first register file circuitry and the second execution circuitry comprises second register files circuitry, i.e. the register file circuitry is not shared. In order to support the transfer of state the control circuitry is configured to transfer as a hardware driven operation (i.e. not requiring any software instructions to be executed to perform the operation) state data transfer between the first register circuitry and the second register circuitry when there is change in which of the execution circuitry is selected as active.

In order to generate appropriate data specifying the predicted execution target to follow a sequence of program instructions, the prediction circuitry may be configured to divide the sequences in some manner and then determine for each sequence performance data indicative of at least one of time taken to execute that sequence and an energy consumed when executing that sequence for each of the first execution circuitry and the second execution circuitry. The prediction circuitry may then serve to select which of the first execution circuitry and the second execution circuitry should serve as the predicted execution target in dependence upon this performance data.

The performance data may in some embodiments be detected performance dependent upon state capture during actual execution of the sequence of program instruction by at least one of the first execution circuitry and the second execution circuitry. In other embodiments or in combination with such detective performance, the control circuitry may also be configured to determine performance data based upon modeled execution of the sequence of program instructions by at least one of the first execution circuitry and the second execution circuitry.

Viewed from another aspect the present invention provides an apparatus for processing data under control of program instructions, said apparatus comprising:

first execution means for executing program instructions;

second execution means for executing said program instructions, said second execution means having a lower energy consumption when executing said program instruction than said first execution means, and said second execution means requiring a longer time to execute said program instructions than said first execution means; and control means for controlling whether said program instructions are executed by said first execution means or said second execution means, wherein said control means comprises prediction means for:
(i) predicting a predicted identity of a next sequence of program instructions to be executed in dependence upon a most recently executed sequence of program instructions; and
(ii) in dependence upon said predicted identity, predicting a predicted execution target corresponding to whether said next sequence of program instructions should be executed with said first execution means or said second execution means; and said control means selects either said first execution means or said second execution means to execute said next sequence of program instructions in dependence upon said predicted execution target.

Viewed from a further aspect the present invention provides a method of processing data under control of program instructions, said method comprising the steps of:

executing program instructions with first execution circuitry;

executing said program instructions with second execution circuitry, said second execution circuitry having a lower energy consumption when executing said program instruction than said first execution circuitry, and said second execution circuitry requiring a longer time to execute said program instructions than said first execution circuitry; and controlling whether said program instructions are executed by said first execution means or said second execution means, wherein said step of controlling comprises:
(i) predicting a predicted identity of a next sequence of program instructions to be executed in dependence upon a most recently executed sequence of program instructions; and
(ii) in dependence upon said predicted identity, predicting a predicted execution target corresponding to whether said next sequence of program instructions should be executed with said first execution circuitry or said second execution circuitry; and
(iii) selecting either said first execution circuitry or said second execution circuitry to execute said next sequence of program instructions in dependence upon said predicted execution target.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
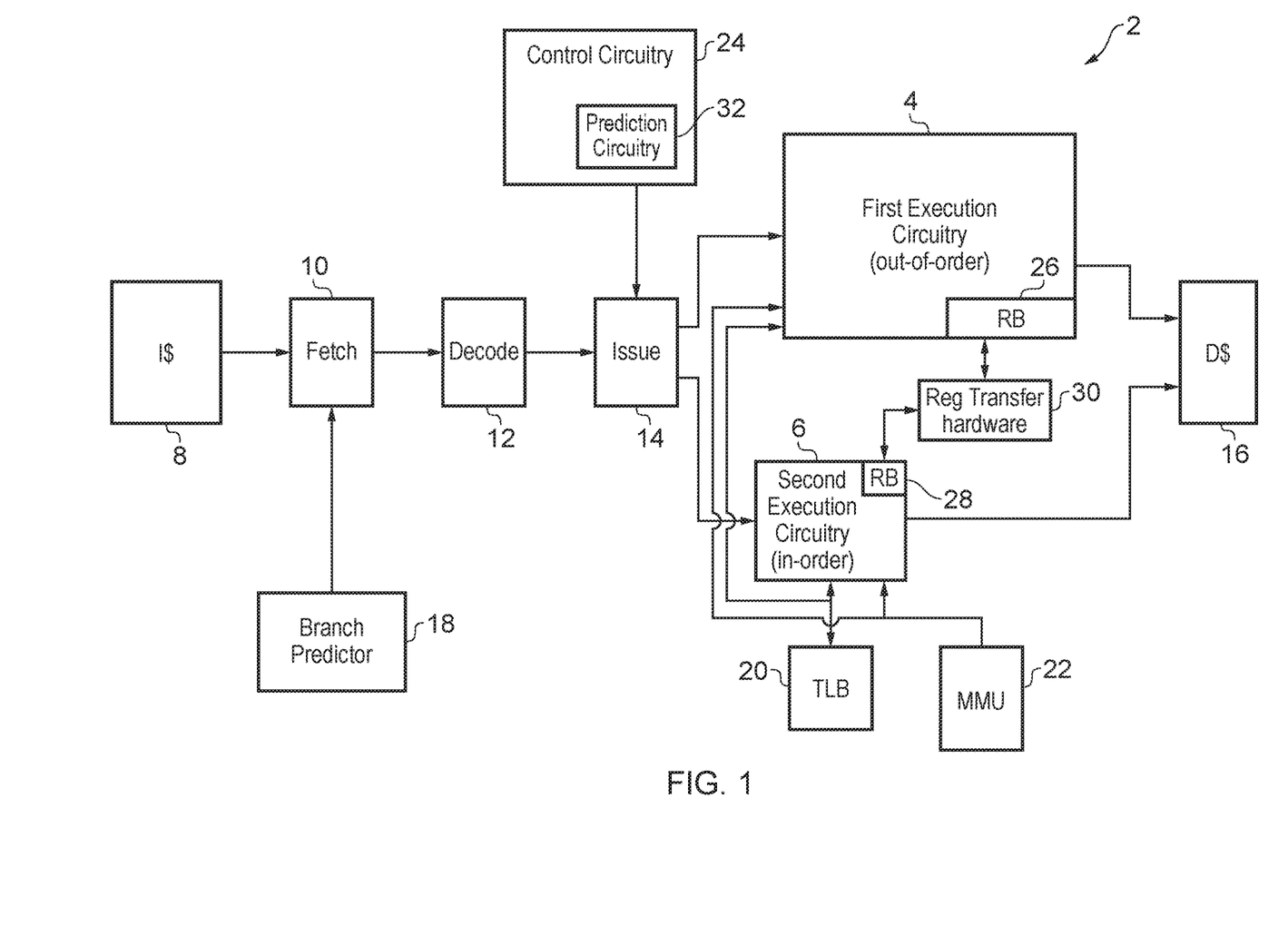
FIG. 1 schematically illustrates an apparatus for processing data including first execution circuitry and second execution circuitry.

FIG. 1 schematically illustrates apparatus 2 for processing data, which may be formed on an integrated circuit, for example, as part of a system-on-chip integrated circuit. The apparatus 2 includes first execution circuitry 4 and second execution circuitry 6. The first execution circuitry 4 comprises multiple execution pipelines, such as arithmetic pipelines, load/store pipelines, SIMD pipelines, floating point pipelines etc, which are configured to support out-of-order program execution. It will be appreciated by those in this technical field that such execution circuitry will yield a high performance in terms of the number of instructions per cycle which may be executed, but will typically have the disadvantage of consuming a higher level of power. The second execution circuitry 6 comprises pipelines, such as arithmetic, load/store, SIMD, vector, floating point etc, that are capable of supporting in-order execution. This second execution circuitry will give a lower performance in terms of instruction per cycle executed, but will typically consume less energy than the first execution circuitry when executing a given sequence of instructions. Accordingly, the second execution circuitry has a lower energy consumption when executing a sequence of program instructions than the first execution circuitry but the second execution circuitry will take longer to execute that sequence of program instructions than the first execution circuitry. The first execution circuitry accordingly provides a high performance and high power execution mechanism whereas the second execution circuitry represents a relatively low performance and low power execution mechanism.

The apparatus 2 of FIG. 1 will be seen further to include an instruction cache 8, instruction fetch circuitry 10, instruction decode circuitry 12, instruction issue circuitry 14, data cache circuitry 16, branch predictor circuitry 18, translation look aside buffer circuitry 20 and memory management unit circuitry 22 which are all shared by the first execution circuitry 4 and the second execution 6. Program instructions fetched from the instruction cache memory 8 by the instruction fetch circuitry 10 are decoded by the instruction decoder circuitry 12 and then placed within an issue queue within the instruction issue circuitry 14. The instruction issue circuitry 14 issues these instructions to either the first execution circuitry 4 or the second execution circuitry 6 depending upon which is active. Control circuitry 24 coupled to the instruction issue circuitry 14 controls the instruction issue circuitry 14 to select either the first execution circuitry 4 or the second execution circuitry 6 to be active. When a change is made as to which of the first execution circuitry 4 or the second execution circuitry 6 is active, then the pipelines of the existing active circuitry are first drained of pending program instructions before the contents of the active register file circuitry 26, 28 are transferred to the newly active register file circuitry 26, 28 using register transfer hardware circuitry 30 (without requiring software execution). In this way, the state held within all of the shared elements of the data processing apparatus 2 need not be moved/switched when a change of active execution circuitry is made, and the relatively small amount of state held within the register files 26, 28 may be transferred with little time penalty or energy penalty using the register transfer hardware circuitry 30.

The program instructions to be executed have associated with them memory addresses within the memory address space. The default program flow executes these instructions in an ascending program address order as will be familiar to those in this technical field. The program instructions may be divided into sequences of program instructions including a next sequence of program instructions and a most recently executed sequence of program instructions in accordance with divisions (boundaries) based upon the requirements that the sequences of program instructions contain more than a threshold number of program instructions and that the sequences of program instructions are bounded by non-sequential instructions at which the program flow moves in a direction opposite to the default direction, i.e. backward jumps in program counter value also known as "backward edges".

The non-sequential instructions may comprise for example branch instructions, call instruction or return instructions which result in a backwards (decreasing) program address (program counter) value.

It will be appreciated that as the threshold value, which may typically be between 100 and 10,000, and in some embodiments may be substantially 300, sets a minimum length for the sequences, the sequences may contain multiple non-sequential instructions and typically will contain multiple non-sequential instructions.

As the boundary between sequences is marked by a non-sequential instruction, then that non-sequential instruction is included within one of the sequences between which it marks the boundary. In the described example embodiments herein, the sequences of program instructions are bounded at their execution start end by a non-sequential instruction within an immediately preceding sequence of instructions within a program flow (e.g. a non-sequential instruction terminating a sequence is deemed to fall within that sequence which it terminates).

The control circuitry 24 includes prediction circuitry 32 used to predict a predicted identity for a next sequence program instructions to be executed in dependence upon a most recently executed sequence of program instructions. Furthermore, this prediction circuitry 32 is configured such that in dependence upon the predicted identity of the next sequence of program instructions to be executed, a prediction is made of a predicted execution target corresponding to whether that next sequence of program instructions should be executed with the first execution circuitry 4 or the second execution circuitry 6. The control circuitry 24 uses this predicted execution target to control the issue circuitry 14 to perform any required switch of active execution circuitry 4, 6 and to issue the next sequence of program instructions to the next predicted execution target.

The prediction circuitry 32 contains hash generating circuitry configured to generate a hash value that may be used as at least part of an identifier value for a sequence of program instructions (divided as discussed above) in dependence upon address values of at least some of the non-sequential instructions within that sequence. Such hash values provide a way of distinguishing between sequences with relatively low processing and storage overheads. The hash value generating circuitry 32 may be configured to generate the hash value using a hashing function that gives a greater weight to address values of non-sequential program instructions (back edge instructions) that are situated later in the program flow order within the sequence of program instructions. In some embodiments the hash generating circuitry may be configured to generate a hash value that is dependent upon N non-sequential program instructions in the program flow order (the latest such N non-sequential instructions), where N is a integer value and is substantially equal to 15.

The prediction circuitry 32 may also be configured to use at least part of the target address value of a program instruction to be executed following a non-sequential program instruction terminating a sequence program instructions as at least part of the identifier value for that sequence of program instructions. Thus, for example, a low order bit portion (e.g. lowest three bits identifying different instruction words) of the target address for the program instruction to be executed following a sequence of program instructions may be used as a part of the identifier for that sequence of program instructions. This gives rise to the possibility that the same sequence of program instructions may be executed but have different target addresses for the sequence to follow and so yield two different identifier values as those different target addresses are incorporated within the identifier value for the sequences.

One way of forming the prediction circuitry is that it is configured to generate an identifier value for the most recently executed sequence of program instructions and includes identifier prediction table circuitry configured to use the identifier value for the most recently executed sequence of program instruction as an index within that identifier prediction table circuitry in order to predict an identifier value for the next sequence of program instructions. Thus, there is provided a look up between an identifier value of a sequence of program instructions just executed and a predicted identifier value for in predicted next sequence of program instructions to be executed.

The prediction circuitry 32 may further include target prediction table circuitry which is configured to use the identifier for the next sequence of program instructions as an index into this target prediction tables circuitry in order to predict the predicted execution target. Thus, the predicted next sequence of program instructions may be used to look up a predicted target execution circuitry for that next sequence of program instructions.

The prediction circuitry 32 may include feedback generator circuitry which serves to determine for each sequence of program instructions performance data which indicates at least one of the time taken to execute that sequence and an energy consumed executing that sequence for each of the first execution circuitry and a second execution circuitry. This performance data may then be used to form the data which identifies which of the first execution circuitry and the second execution circuitry should serve as a predicted execution target for a given sequence of program instructions. The performance data may be based upon detected actual state information/data captured during execution of the sequences of program instructions by at least one of the first execution circuitry and a second execution circuitry. Alternatively, or in addition, the performance data may be based on the modeled execution of the sequences of program instructions by at least one of the first execution circuitry and the second execution circuitry.

Figure 2:
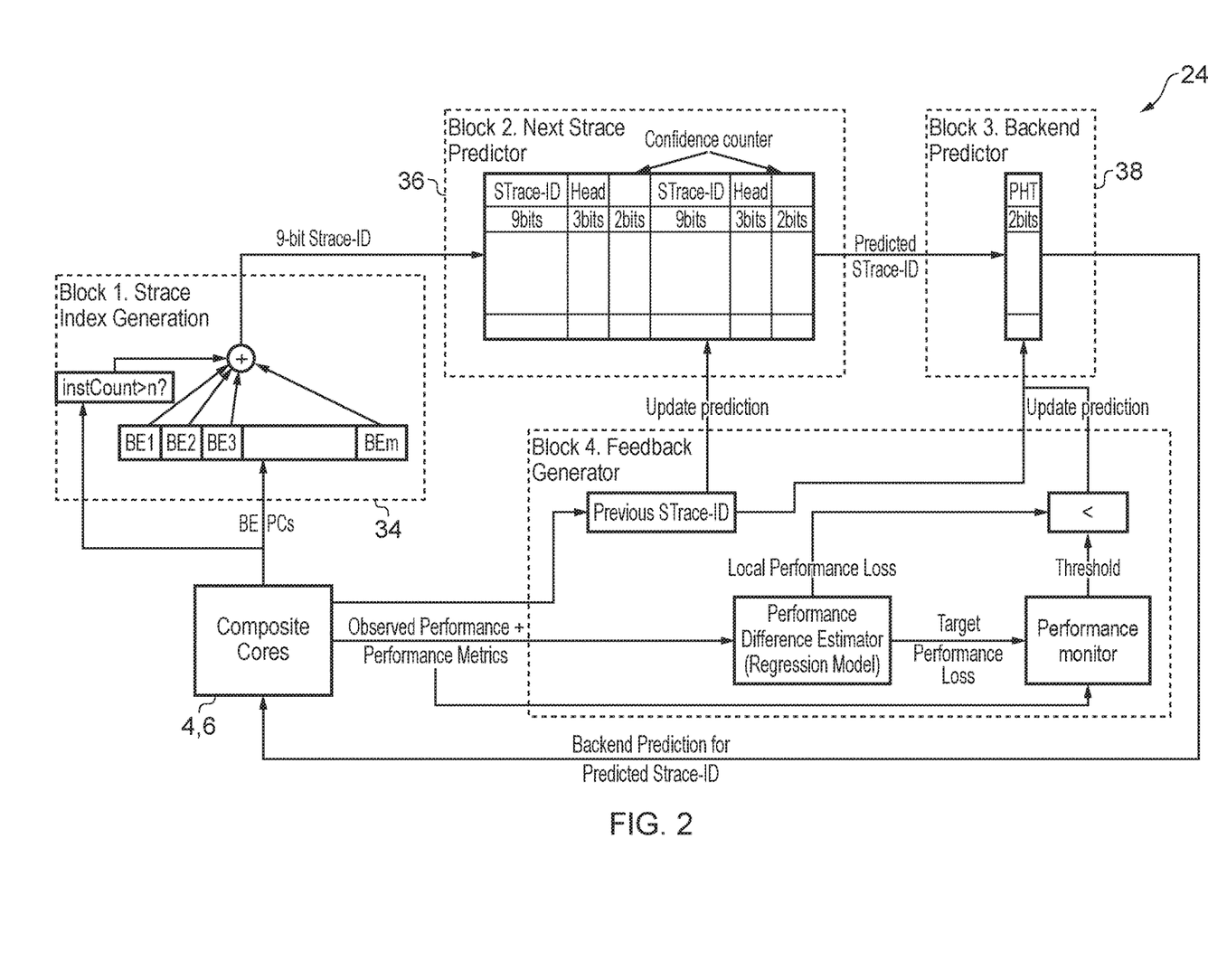
FIG. 2 schematically illustrates prediction circuitry for predicting which of the first execution circuitry and the second execution circuitry should be used to execute a next sequence of program instructions within the program flow.

FIG. 2 schematically illustrates the first execution circuitry 4 and the second execution circuitry 6 in the form of composite cores coupled to control circuitry which includes the prediction circuitry. In particular FIG. 2 shows hash generating circuitry 34, identifier prediction table circuitry 36, and target prediction table circuitry 38. The sequences of program instructions may also be termed "super-traces" as will be described further below. The non-sequential instructions may be considered as back edges (BE) within the program flow as will also be described further be.

General purpose applications typically exhibit irregular dynamic code behavior but often times follow regular code structure. A controller which can dynamically learn to recognize these regular code sequences or super-traces (explained below) can preemptively map code to backend (first/second execution circuitry) for improved energy efficiency.

While it is possible to use a compiler to detect regular micro phases in a program based on static control flow profiling, it cannot capture regularities imposed by data flow patterns. The present techniques employ a low overhead hardware mechanism to build super-traces and use a simple correlation-based prediction table to predict them.

FIG. 2 illustrates an overview of the predictive approach for scheduling super-traces onto the most efficient backend. Block 1 (Section 1) involves dynamically defining super-trace boundaries and creating pseudo-unique super-trace IDs. Block 2 (Section 2) illustrates a correlation-based table for predicting future super-traces. Block 3 (Section 3) shows the super-trace-to-core-backend predictor table. Block 4 is the feedback mechanism that updates the prediction tables with correct values, in case of mispredictions.

Backedge PCs seen by Composite Cores are hashed to index into the next-super-trace predictor (Block 1). This index references an entry from the backend predictor PHT (Block 2) to decide whether migration of execution is required. The feedback generator (Block 3) monitors dynamic performance and updates the tables accordingly.

Building Super-Traces

In order to have predictable behavior, switching boundaries should enclose intervals that occur repetitively. To identify a super-trace, the technique uses a concept similar to that of traces or frames. Traces are defined as sequences of instructions or basic blocks that have a high likelihood of executing back-to-back, despite the presence of intervening control instruction. These can be identified both statically and dynamically, covering roughly 70% of dynamic instructions. The controller used in this work is organized around traces that are defined at backedge boundaries. A backedge is a control instruction (branches, function calls and returns) that branches to a negatively placed Program Counter (PC) ($PC_{target} < PC_{current}$). They capture the most frequently occurring circular paths in a dynamic instance of code (loops, for example). Since either a function call or its return will be a backedge, traces also account for function bodies. The intuition behind using backward branches is that their target PCs act as global re-convergent points. The control re-convergence point for a particular instruction is defined as a future dynamic instruction that will be eventually reached, regardless of the outcome of any non-exceptional intervening control flow. Traces delineated by these chosen points act as control independent code blocks in trace processors and dynamic multi-threading processors. By ignoring the intervening branches (which account for approx. 93% of the total static branches) between these re-convergence points, future traces can be predicted with higher accuracy. Another advantage of using backedges as switching points is that mispredicted backedges cause a pipeline flush, in order to recover from wrongly speculated instructions. This partially hides the pipeline drain imposed by the architecture in case the thread chooses to migrate. Backedges occur frequently in the SPEC benchmark suite, occurring once every 53 instructions on average. Existing fine-grain heterogeneous cores aren't capable of switching cores at such granularity. Hence backedge traces are merged together until a minimum instruction length boundary has been crossed. This block constrained by the number of instructions in it is referred to as a super-trace. For fine-grained switching this minimum length was experimentally found to be approximately 300 instructions per super-trace, and can go up to 10,000 instructions or as low as 100. Below this minimum length, the switching costs imposed by the core architecture negate energy benefits.

Figure 3:
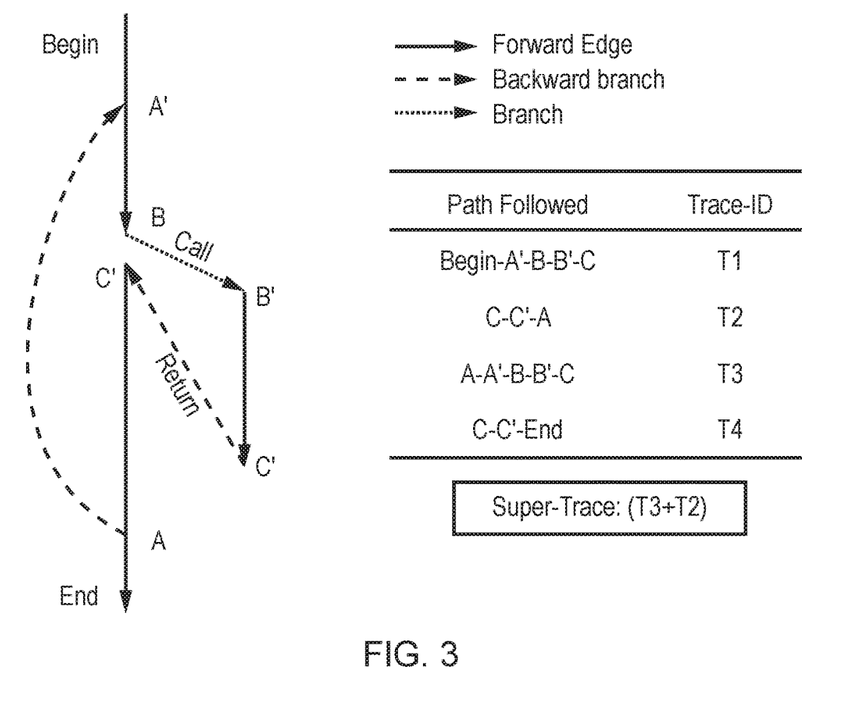
FIG. 3 schematically illustrates the division of the program flow into sequences (super-traces)

FIG. 3 pictorially describes the runtime formation of traces with the help of an example loop with function calls within its body. The return from the function at point C and the return to the loop header at point A are backedges that the hardware observes, dynamically creating traces T2 and T3. If there are around 300 instructions in both T2 and T3 cumulatively, then the hardware defines the sequence (T2+T3) as one super-trace. The super-trace (T2+T3) is representative of this loop and its characteristics will determine which backend it should be run on in the future.

Predicting Super-Traces

A correlation-based predictor is used to predict the next super-trace. A variety of works have demonstrated the efficiency of path based multi-branch predictors. The strength of using such a predictor lies in its ability to capture program context by using path based correlation.

Figure 4:
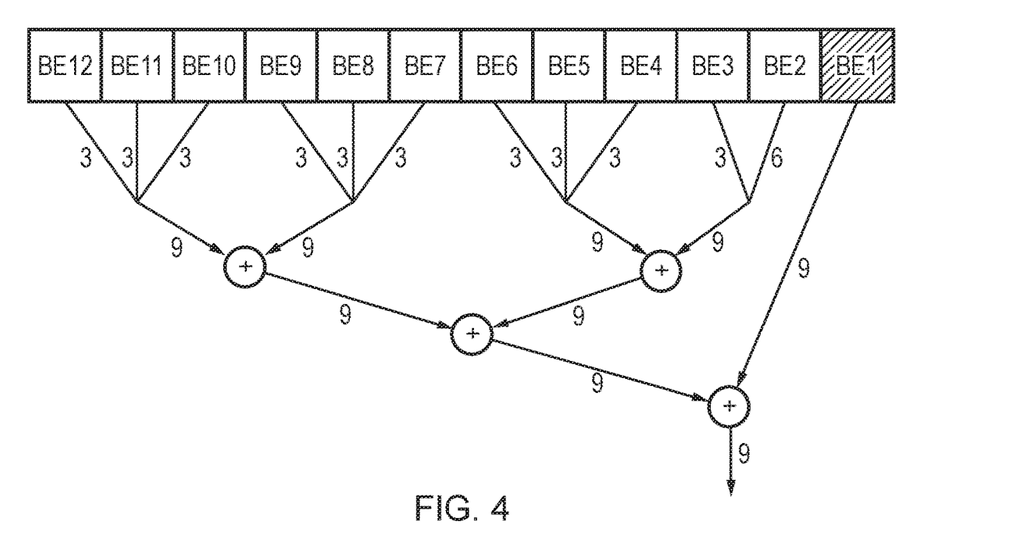
FIG. 4 schematically illustrates a hashing function for generating an identifier value based upon a sequence of addresses of non-sequential instructions.
Figure 5:
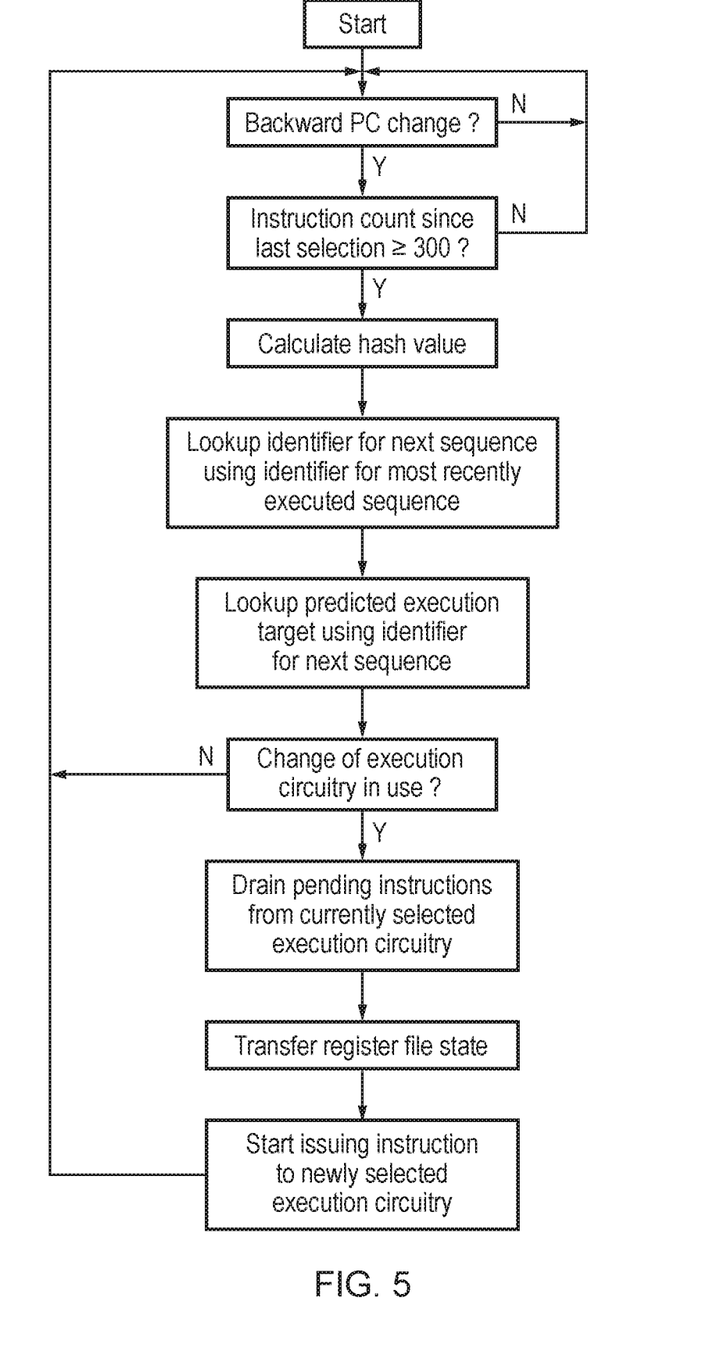
FIG. 5 is a flow diagram schematically illustrating operation of the circuitry of FIG. 2.

As super-traces are limited by a maximum instruction length, the number of backedges per super-trace is variable. For example, for a super-trace length of 300 instructions, this number varies between 4 for lbm and 20 for mcf on average, with an average of 12 backedges per super-trace across all the benchmarks. A super-trace made of 1000 instructions has approximately 35 backedges on average across all benchmarks. Ideally, the super-trace-ID used to index into the prediction table should be a concatenation of all the backedge PCs that form it. But practical limitations, like hardware overheads, mandate a restriction on the number of backedges that can be used to uniquely identify a super-trace. Sensitivity studies were performed for accuracy of prediction using the last 12, 15, 21, and 30 backedges in a super-trace to form its ID. Analysis showed that keeping the last 15 backedges was sufficiently accurate, providing low aliasing with minimal overheads. This analysis used an indexing mechanism similar to that described in Q. Jacobson, E. Rotenberg, and J. E. Smith. Path-based next trace prediction. In proceedings of the $30^{th}$ annual ACM/IEEE international symposium on Microarchitecture, pages 14-23, 1997 to create a pseudo-unique super-trace-ID, as shown in FIG. 4. This technique gives higher priority to a more recently seen backedge by hashing more of its bits as compared to the older backedges. The intuition behind this approach is that more recently executed branches are more likely to indicate what code is executed next. The specific parameters of the index generation mechanism were determined experimentally.

The generated super-trace-ID is used to index into a two-way associative prediction table that consists of two possible successors of this trace (FIG. 2). Since the next super-trace prediction is made when the last instruction of the previous super-trace is known. To use this information, the last three bits (excluding the byte offset) of the next PC is stored along with the hashed super-trace-ID for each super-trace. This head PC acts as a tag to select one of the two potential successors in the table. A 2-bit saturating counter per successor ID is used to select replacements candidates. In case of an incorrect prediction, the table is updated with the correct successor. Either the entry with the lower counter value is demoted, or deleted if the counter is zero. In case of a correct prediction, the confidence counter is incremented by one.

Scheduling Super-Traces

The controller is built on the hypothesis that behavior of a recurring trace can be estimated based on its individual characteristics, in conjunction to the context (super-trace) in which it appears. The controller uses these two pieces of information to map a super-trace to the most efficient backend.

A simple 2-bit saturating counter is used to predict whether a super-trace should be executed on the Big (4) or Little (6) backend (FIG. 2). The super-trace-ID outputted by the super-trace predictor is used to index into a Pattern History Table (PHT) which steers the program execution to either backend. A comparison with more complex predictors, like two level adaptive local and global predictors, showed that the accuracy gains achieved from higher sophistication were not significant enough to warrant the extra hardware.

The feedback to this backend predictor is given by a performance model that captures the microarchitectural characteristics of the super-trace. A threshold controller provides an average per-super-trace performance loss threshold below which it is currently profitable to switch to Little (6), given the performance target. A tuned Proportional-Integral (PI) feedback control loop scales this threshold by observing the proximity of current performance to the target performance setpoint. This performance monitoring is assisted by linear regression model which estimates the target performance (only Big) and observes current performance (Big+Little). The system employs a linear regression model which estimates a super-trace's performance on the inactive backend using performance metrics such as number of cache misses, branch mispredicts, the ILP (intruction level parallelism) and MLP (memory level parallelism) inherent in the code and its dependency on previously executed super-traces. These metrics succinctly capture the characteristics of individual super-traces and can be used to determine the resources that can best extract its performance efficiently. For example, if a super-trace is a compute-intensive loop with high ILP, it is always better to run it on the Big out-of-order backend. However, if a super-trace is a memory intensive function back to back dependent load misses can potentially stall the core. Such a super-trace will consume less energy if run on Little. At the end of execution of a super-trace, its observed performance is compared to the threshold, and accordingly its PHT entry is updated to show its tendency towards execution on Big (4) or Little (6).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data under control of program instructions, said apparatus comprising:
   first execution circuitry configured to execute program instructions;
   second execution circuitry configured to execute said program instructions, said second execution circuitry having a lower energy consumption when executing said program instruction than said first execution circuitry, and said second execution circuitry requiring a longer time to execute said program instructions than said first execution circuitry; and
   control circuitry configured to control whether said program instructions are executed by said first execution circuitry or said second execution circuitry, wherein
   said control circuitry comprises prediction circuitry configured:
      (i) to predict a predicted identity of a next sequence of program instructions to be executed in dependence upon a most recently executed sequence of program instructions; and
      (ii) in dependence upon said predicted identity, to predict a predicted execution target corresponding to whether said next sequence of program instructions should be executed with said first execution circuitry or said second execution circuitry; and
   said control circuitry is configured to select either said first execution circuitry or said second execution circuitry to execute said next sequence of program instructions in dependence upon said predicted execution target.

2. Apparatus as claimed in claim 1, wherein said program instruction have associated addresses and default program flow executes instructions in an order corresponding to advancing sequentially through said addresses in a default direction, and said prediction circuitry divides said program instructions into sequences of program instructions, said sequences of program instructions including said next sequence of program instructions and said most recently executed sequence of program instructions, in accordance with:
   (i) said sequences of program instructions contain more than a threshold number of program instructions; and
   (ii) said sequences of program instructions are bounded by non-sequential instructions at which program flow moves in a direction opposite to said default direction.

3. Apparatus as claimed in claim 2, wherein said non-sequential instructions comprise one or more of: a branch instruction, a call instruction and a return instruction.

4. Apparatus as claimed inn claim 2, wherein said default direction corresponds to sequentially increasing addresses associated with said program instructions.

5. Apparatus as claimed in claim 2, wherein said sequences of program instructions are free to contain one or more non-sequential instructions between said non-sequential instructions that bound said sequences of program instructions.

6. Apparatus as claimed in claim 2, wherein said sequences of program instructions are bounded at their execution start by a non-sequential instruction within an immediately preceding sequence of program instructions within said program flow.

7. Apparatus as claimed in claim 2, wherein said prediction circuitry comprises hash generating circuitry configured to generate a hash value used as at least part of an identifier value for a sequence of program instructions in dependence upon addresses values of at least some of said non-sequential instruction within said sequence of program instructions.

8. Apparatus as claimed in claim 7, wherein hash generating circuitry is configured to generate said hash value using a hashing function that gives greater weight to address values of non-sequential program instructions disposed later in program flow order within said sequence of program instructions.

9. Apparatus as claimed in claim 7, wherein hash generating circuitry is configured to generate said hash value using a hashing function that is dependent upon a latest N non-sequential program instructions in program flow order disposed within said sequence of program instructions, wherein N is an integer value equal to 15.

10. Apparatus as claimed in claim 7, wherein said prediction circuitry is configured to use at least part of a target address value of program instruction to be executed following a non-sequential program terminating a sequence of program instructions as at least part of said identifier value for said sequence of program instructions.

11. Apparatus as claimed in claim 2, wherein said threshold number is between 100 and 10000.

12. Apparatus as claimed in claim 2, wherein said threshold number is 300.

13. Apparatus as claimed in claim 1, wherein said prediction circuitry is configured to generate an identifier value for said most recently executed sequence of program instructions and said prediction circuitry comprises identifier prediction table circuitry configured to use said identifier value for said most recently executed sequence of program instructions as an index to said identifier prediction table circuitry to predict an identifier value for said next sequence of program instructions.

14. Apparatus as claimed in claim 13, wherein said prediction circuitry comprises target prediction table circuitry configured to use said identifier for said next sequence of program as an index to said target prediction table circuitry to predict said predicted execution target.

15. Apparatus as claimed in claim 1, wherein said first execution circuitry and said second execution circuitry share one or more of: instruction fetch circuitry, instruction decoder circuitry, cache memory circuitry; branch predictor circuitry, memory management circuitry and translation lookaside buffer circuitry.

16. Apparatus as claimed in claim 1, wherein said first execution circuitry comprises first register file circuitry and said second execution circuitry comprises second register file circuitry and wherein said control circuitry is configured to transfer as a hardware driven operation state data between said first register circuitry and said second register circuitry when there is a change in which of said first execution circuitry and said second execution circuitry is selected to execute said program instructions.

17. Apparatus as claimed in claim 1, wherein said prediction circuitry divides said program instructions into sequences of program instructions, said sequences of program instructions including said next sequence of program instructions and said most recently executed sequence of program instructions, said control circuitry is configured to determine for each sequence of program instruction performance data indicative of at least one of a time taken to execute said sequence of program instructions and energy consumed when executing said sequence of program instructions by each of said first execution circuitry and said second execution circuitry and said prediction circuitry to configured to select which of said first execution circuitry and said second execution circuitry should serve as said predicted execution target in dependence upon said performance data.

18. Apparatus as claimed in claim 17, wherein said control circuitry determines said performance data based upon at least one of:

(i) detected performance indicative state captured during execution of said sequence of program instructions by at least one of said first execution circuitry and said second execution circuitry; and (ii) modelled execution of said sequence of program instructions by at least one of said first execution circuitry and said second execution circuitry.

19. Apparatus for processing data under control of program instructions, said apparatus comprising:
first execution means for executing program instructions;
second execution means for executing said program instructions, said second execution means having a lower energy consumption when executing said program instruction than said first execution means, and said second execution means requiring a longer time to execute said program instructions than said first execution means; and
control means for controlling whether said program instructions are executed by said first execution means or said second execution means, wherein
said control means comprises prediction means for:
(i) predicting a predicted identity of a next sequence of program instructions to be executed in dependence upon a most recently executed sequence of program instructions; and
(ii) in dependence upon said predicted identity, predicting a predicted execution target corresponding to whether said next sequence of program instructions should be executed with said first execution means or said second execution means; and
said control means selects either said first execution means or said second execution means to execute said next sequence of program instructions in dependence upon said predicted execution target.

20. A method of processing data under control of program instructions, said method comprising the steps of:
executing program instructions with first execution circuitry;
executing said program instructions with second execution circuitry, said second execution circuitry having a lower energy consumption when executing said program instruction than said first execution circuitry, and said second execution circuitry requiring a longer time to execute said program instructions than said first execution circuitry; and
controlling whether said program instructions are executed by said first execution means or said second execution means, wherein
said step of controlling comprises:
(i) predicting a predicted identity of a next sequence of program instructions to be executed in dependence upon a most recently executed sequence of program instructions; and
(ii) in dependence upon said predicted identity, predicting a predicted execution target corresponding to whether said next sequence of program instructions should be executed with said first execution circuitry or said second execution circuitry; and
(iii) selecting either said first execution circuitry or said second execution circuitry to execute said next sequence of program instructions in dependence upon said predicted execution target.

* * * * *